United States Patent Office 3,445,431
Patented May 20, 1969

3,445,431
ONE STEP PROCESS FOR PREPARING THE REACTION PRODUCT OF A SPACED POLYPHENOL, PHENOL AND AN ALDEHYDE
John D. Nelson, Pittsfield, Mass., assignor to General Electric Company, a corporation of New York
No Drawing. Continuation-in-part of application Ser. No. 549,484, May 12, 1966. This application Aug. 15, 1968, Ser. No. 752,763
Int. Cl. C08g 5/10
U.S. Cl. 260—51      5 Claims

ABSTRACT OF THE DISCLOSURE

A process for preparing a phenolic resinous condensation product, which process is a one-step process of reacting a spaced polyphenol, a monohydric phenol and an aldehyde in the presence of a particular catalyst and at a temperature of at least 130° C. The catalyst employed may be either an earth-alkali metal, an earth metal or a heavy metal hydroxide or oxide. Further, the aldehyde employed must be present in an amount of less than one mole thereof per mole of the spaced polyphenol and phenol combined.

---

This application is a continuation-in-part of copending application Ser. No. 549,484 filed May 12, 1966, now abandoned.

This invention relates to a one-step process for preparing resinous condensation reaction products of a spaced polyphenol, phenol and an aldehyde.

Generally, it has been known to prepare condensation reaction products of methylolated spaced polyphenols and phenol which are then in turn reacted with an aldehyde to prepare resinous products as disclosed in U.S. Patent 2,859,204. These resinous products can be advanced to an infusible state by the application of heat and in the presence of a cross-linking agent such as hexamethylenetetramine. However, in the preparation of these resinous condensation products as disclosed in the above-identified U.S. patent, it requires many steps in the final preparation thereof. The first step requires methylolating the spaced polyphenol. This is achieved separately by reacting the spaced polyphenol with a certain amount of an aldehyde preferably paraformaldehyde to methylolate the spaced polyphenol. Secondly, the product is recovered and additionally reacted with phenol to prepare what is known as a cross-condensate. This cross-condensate is prepared by reacting the methylolated spaced polyphenol with phenol in the presence of a strong acid catalyst such as sulfuric acid. Thirdly, the cross-condensate is then reacted with an aldehyde in the presence of an acid catalyst to form the resinous condensation product. The resulting product while requiring many steps in the preparation thereof also contains gelled resin products therein. To mold an article therewith results in the article being unsatisfactory due to surface defects resulting from the gelled resin particles. To filter the resin is difficult, time consuming and thus costly. In addition, such a resin is not easily grindable since the resin is somewhat soft and tacky in most cases. Therefore, it has been surprisingly discovered that a resinous condensation product can be prepared by a one-step process with the resulting resinous product being free of gelled resin particles.

Therefore, it is an object of this invention to provide a one-step process for preparing particular resinous condensation products.

Another object of this invention is to provide a process for preparing resinous condensation products free of gelled particles.

These and other objects will become apparent to one skilled in the art from the following description thereof.

Briefly, in accordance with the practice of this invention, these and other objects are attained by reacting a spaced polyphenol, a phenol and an aldehyde in the presence of a particular catalyst and at a temperature of at least 130° C. The reaction is carried out in a one-step process and in such a fashion that the aldehyde is added incrementally while maintaining a temperature of at least 130° C. The resulting product, upon removal of excess phenol and cooling, is a solid, easily grindable resin which is completely free of gelled resin particles and is a clear homogeneous single-phase resin.

The following examples are set forth to illustrate more clearly the principle and practice of this invention to those skilled in the art and are not meant to be limiting in the practice thereof. Unless otherwise specified, where parts or percentages are mentioned, they are parts or percentages by weight.

Example I

To a reaction kettle fitted with a reflux condenser, add 330 parts of a spaced polyphenol, 508 parts of phenol and 16.7 parts of a magnesium hydroxide catalyst. The mixture is heated to 140° C. While maintaining this temperature, 125.5 parts of paraformaldehyde are added incrementally over a period of about one hour. The spaced polyphenol employed herein is prepared by the alkylation of phenol with a chlorinated hydrocarbon such as chlorinated paraffin wax. Specifically, the spaced polyphenol employed herein is Flexiphen 160 produced by Koppers Company, Inc. and fully described in Bulletin P.D. 105. The spaced polyphenol is a polymethylene polyphenol mixture containing 2 to 4 phenolic nuclei separated by polymethylene chains of approximately 25 carbon atoms. At the end of the reaction, excess phenol is removed under vacuum distillation.

Upon cooling, the resin solidifies to a clear single-phase homogeneous resin which is easily grindable and is free of gelled resin particles.

Example II

Example I is repeated except that the spaced polyphenol employed herein is one as prepared by Example I of U.S. Patent 2,800,512.

The results obtained are essentially the same as Example I.

Example III

Example I is repeated except that a phosphoric acid is used in place of the magnesium hydroxide employed therein.

The resulting resin is a two-phase cloudy resin consisting of a spaced polyphenol-aldehyde resin and a phenol-aldehyde resin.

Example IV

Example I is repeated except that sulfuric acid is used in place of magnesium hydroxide herein.

The resulting resin is a two-phase cloudy resin with gelled particles in a liquid medium.

Example V

Example I is repeated except that a temperature of 100° C. is employed herein instead of the 140° C. of Example I. The resulting resin is a two-phase, cloudy non-homogeneous resin.

Example VI

Example I is repeated except that in place of the magnesium hydroxide employed herein, sodium hydroxide is employed herein as the reaction catalyst.

The resin gels and solidifies in the reaction vessel prior to the completion of the reaction.

The instant invention is directed to a one-step process for preparing a resinous condensation product of particular phenols and an aldehyde. In addition, the instant invention is also directed to the condensation reaction products prepared by the process of this invention, which products can be used in molding operations.

The process of this invention is a one-step process for preparing a resinous condensation product. The one-step process comprises reacting a spaced polyphenol, a phenol and an aldehyde in the presence of a particular catalyst and at a room temperature of at least 130° C. Preferably, the process is carried out in the presence of the particular catalyst by first heating the spaced polyphenol and the phenol to a temperature of at least 130° C. and then reacting incrementally, the aldehyde therewith while maintaining a temperature of at least 130° C. In addition, by removing the excess phenol, preferably below 8 weight percent and particularly below 6 weight percent, a solid easily grindable resin is obtained. The particular catalyst employed herein must be one selected from the group consisting of earthalkali metal, earth metal and heavy metal hydroxides and oxides. In addition, the total aldehyde content employed in the process of this invention must be an amount such that less than one mole thereof is reacted per mole of spaced polyphenol and phenol combined. The critical and surprising feature of the instant invention is that by employing the particular catalyst and a temperature of at least 130° C., a one-step process for preparing the resinous condensation product can be achieved. In addition, it is preferred to react the aldehyde incrementally while maintaining the temperature of at least 130° C., since a violent evolution of the aldehyde can occur if added otherwise. By employing a different catalyst or different temperatures of reaction, the examples clearly show that the desired resin is not obtained. The resulting product obtained in the practice of the process of the instant invention is a resin which is clear of gelled resin particles. Depending upon the amount of aldehyde employed during the reaction thereof, the reaction product may be either a liquid or a solid with a solid state being the preferred state of the resin. The solid state is certainly better suited for molding applications. In addition, the solid resin is easily grindable to provide a finely divided resin which will not cake upon standing.

As stated previously, the particular catalyst employed herein can be either an earthalkali metal, earth metal or heavy metal hydroxide or oxide. Examples of the particular catalysts which can be employed in the practice of this invention in place of that used in Example I are barium hydroxide, magnesium hydroxide, aluminum oxide, aluminum hydroxide, calcium hydroxide, zinc oxide, zinc hydroxide, iron oxide and magnesium oxide. The results obtained are essentially the same as obtained in the example. Preferably in the practice of this invention, magnesium hydroxide is the preferred catalyst. In addition, the preferred temperature range to be employed in the practice of the claimed process is a temperature of between 130–200° C.

As discussed previously, the condensation products prepared in accordance with the practice of this invention are the reaction products of spaced polyphenol, a phenol and an aldehyde wherein the reaction is carried out in the presence of particular catalysts. The resulting condensation reaction product is the reaction product of less than one mole of an aldehyde per mole of spaced polyphenol and phenol combined. Actually, it is preferable to react 0.5–0.9 and particularly 0.6–0.8 mole of an aldehyde per mole of spaced polyphenol and phenol combined.

As used herein an aldehyde shall mean any aldehyde which will react with a phenol. This includes paraformaldehyde, formaldehyde, acetaldehyde, butyraldehyde and furfuraldehyde. Preferably, the aldehyde employed in the practice of this invention is paraformaldehyde.

In addition to the above, phenol as used herein shall mean monohydric phenols such as monohydroxybenzene (phenol) and substituted phenols containing alkyl groups, alkoxy groups and halogen radicals. Again the preferred material to be employed in the practice of this invention is phenol, the monohydroxybenzene.

Spaced polyphenols employed in the practice of this invention are those as fully described in U.S. Patents 2,859,204 and 2,800,512. These are generally prepared by reacting phenol with a chlorinated hydrocarbon such as a chlorinated paraffin wax. This may be better termed as alkylation of a phenol with a chlorinated hydrocarbon. While spaced polyphenols are considered the broader term as described in U.S. Patent 2,895,204, they are also known in the art as "wax phenols." Broadly, the spaced polyphenols as employed in the practice of this invention cover a polyarylolated hydrocarbon having phenolic nuclei separated from each other by polymethylene chains. Generally, in the preparation of the spaced polyphenols, the reaction of the chlorinated hydrocarbon and the phenol are carried out in the presence of a Friedel-Crafts catalyst at elevated temperatures. In addition, the phenol employed in the preparation of these spaced polyphenols may be either phenol, resorcinol, hydroquinone, catechol, xylenol, hydroxydiphenyl, benzolphenol, phenolethylphenyl, methylhydroxydiphenyl, ethylhydroxydiphenyl, alpha and beta naphthols, alkyl naphthols, phenyl, naphthol, toluol, naphthol, xylenol naphthol, benzyl naphthol, etc. as well as halogenated and etherified derivatives thereof. A description of the commercially available spaced polyphenols can be found in Koppers Company, Inc., Bulletin P.D. 105. However, the examples of U.S. Patent 2,800,512 fully describe the process for preparing spaced polyphenols.

The resinous condensation products prepared by the process of this invention require further reaction thereof with an external cross-linking agent in order to be advanced to an infusible state. As known in the art, such materials containing cross-linking agents are generally classified as two-stage resins. Generally, the cross-linking agent may be any material which will cause the resin to advance to a thermoset or infusible state upon the application of heat. In the practice herein, to prepare thermosettable condensation products, the preferred cross-linking agent is hexamethylenetetramine. The amount of hexamethylenetetramine incorporated with the resinous condensation product herein can vary from as little as 5 weight percent to as high as 25 weight percent based on the total weight of the thermosettable composition. Preferably, the range varies from about 12–18 weight percent.

To advance the resin composition described above to the infusible state, the resin composition is merely exposed to elevated temperatures. Temperatures employed can range from about 85° C. to 200° C. The higher the temperature, the shorter the time required to advance the resin to an infusible state.

The advantages obtained in the practice of the one-step process of this invention are quite obvious and quite numerous since the one-step process eliminates processing problems, reduces reaction time and results in a fast curing resin which finds wide use in such applications as molding powder, laminates, foundry sands, core binders, adhesives, etc. In addition, various fillers and other materials including dyes can be included with the resin to provide molding compositions. Further, the composition of this invention, as stated previously, has shorter cure or setting up times and therefore shorter molding times. The catalyst and temperature employed herein promote the ortho-ortho linkage which results in the faster cure times. In addition, the molded articles employing the resin composition set forth herein have excellent hot rigidity.

It will thus be seen that the objects set forth above among those made apparent from the preceding description are efficiently attained and since certain changes may be made in carrying out the above process, and in the composition set forth without departing from the scope of this invention, it is intended that all matters contained in the above description shall be interpreted as illustrative and not in a limiting sense.

What is claimed is:

1. A one-step process for preparing a resinous condensation product, which process consists of reacting a spaced polyphenol, a monohydric phenol and an aldehyde in the presence of a particular catalyst and at a temperature of at least 130° C.; said particular catalyst being selected from the group consisting of earthalkali metal, earth metal and heavy metal hydroxides and oxides, said aldehyde being in an amount of less than one mole thereof per mole of spaced polyphenol and phenol combined and selected from the group consisting of paraformaldehyde, formaldehyde, acetaldehyde and butyraldehyde and said spaced polyphenol consisting of a polyarylolated hydrocarbon having phenolic nuclei separated from each other by polymethylene chains.

2. The process of claim 1 wherein the temperature of the reaction is 130° C.–200° C.

3. The process of claim 1 wherein the particular catalyst is magnesium hydroxide.

4. The process of claim 1 wherein 0.5–0.9 mole of an aldehyde is reacted per mole of spaced polyphenol and phenol combined.

5. The process of claim 1 wherein the aldehyde is paraformaldehyde.

References Cited

UNITED STATES PATENTS

| | | | |
|---|---|---|---|
| 2,800,512 | 7/1957 | Hathaway | 260—613 |
| 2,859,203 | 11/1958 | Fiedler et al. | 260—51 |
| 2,859,204 | 11/1958 | Florentine et al. | 260—51 |
| 3,244,648 | 4/1966 | Bornstein | 260—3 |
| 3,390,128 | 6/1968 | Hughes et al. | 260—51 |

OTHER REFERENCES

Koppers Bulletin P.D. 105, December 1962, pp. 1–9.

WILLIAM H. SHORT, *Primary Examiner.*

HOWARD SCHAIN, *Assistant Examiner.*

U.S. Cl. X.R.

260—52, 53, 54, 55, 59